March 12, 1940. E. F. SAXMAN, JR 2,193,077
STALL WARNING SYSTEM FOR AIRCRAFT
Filed Nov. 18, 1938 2 Sheets-Sheet 1
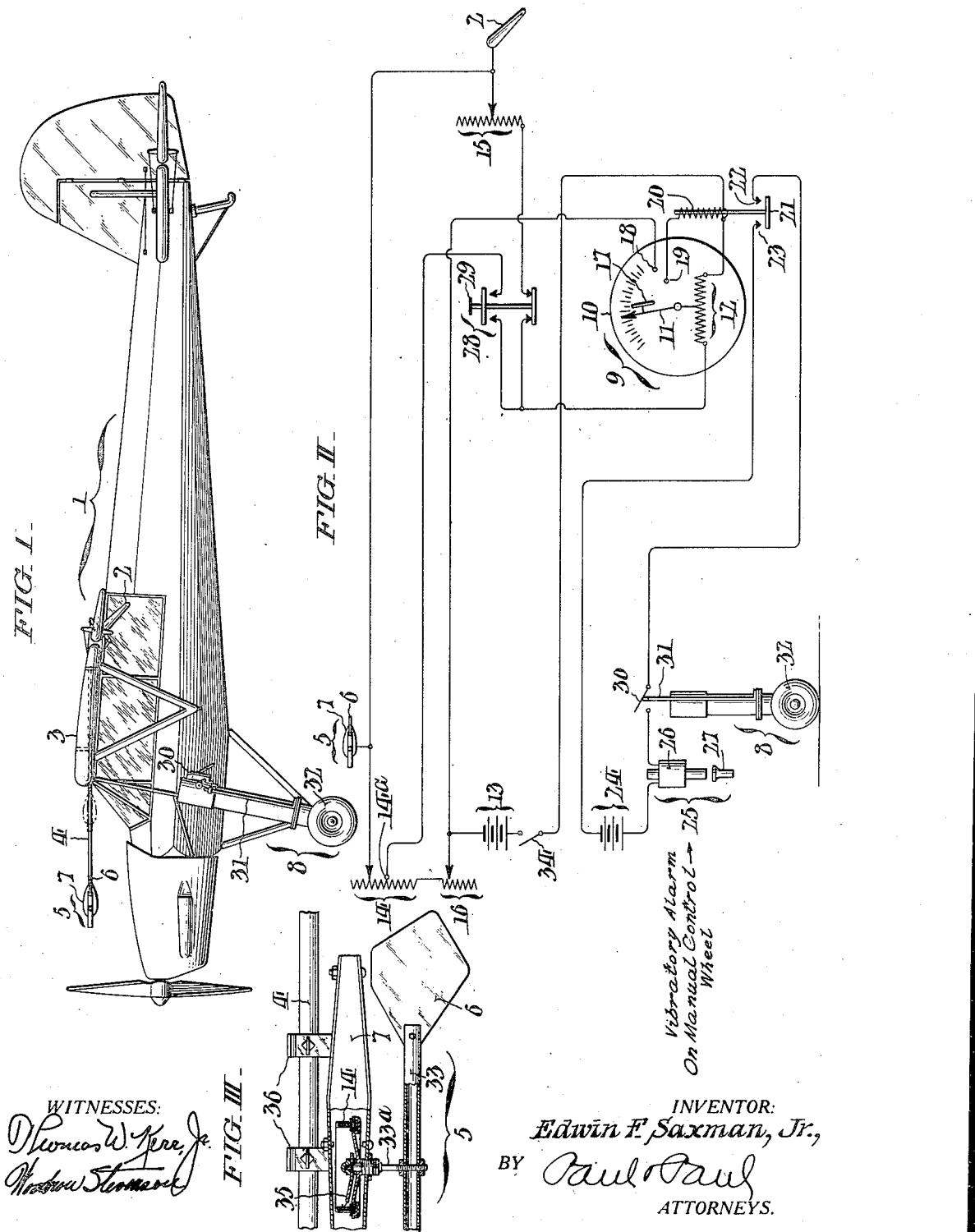
WITNESSES:
INVENTOR:
Edwin F. Saxman, Jr.,
BY
ATTORNEYS.

March 12, 1940.   E. F. SAXMAN, JR   2,193,077
STALL WARNING SYSTEM FOR AIRCRAFT
Filed Nov. 18, 1938   2 Sheets-Sheet 2
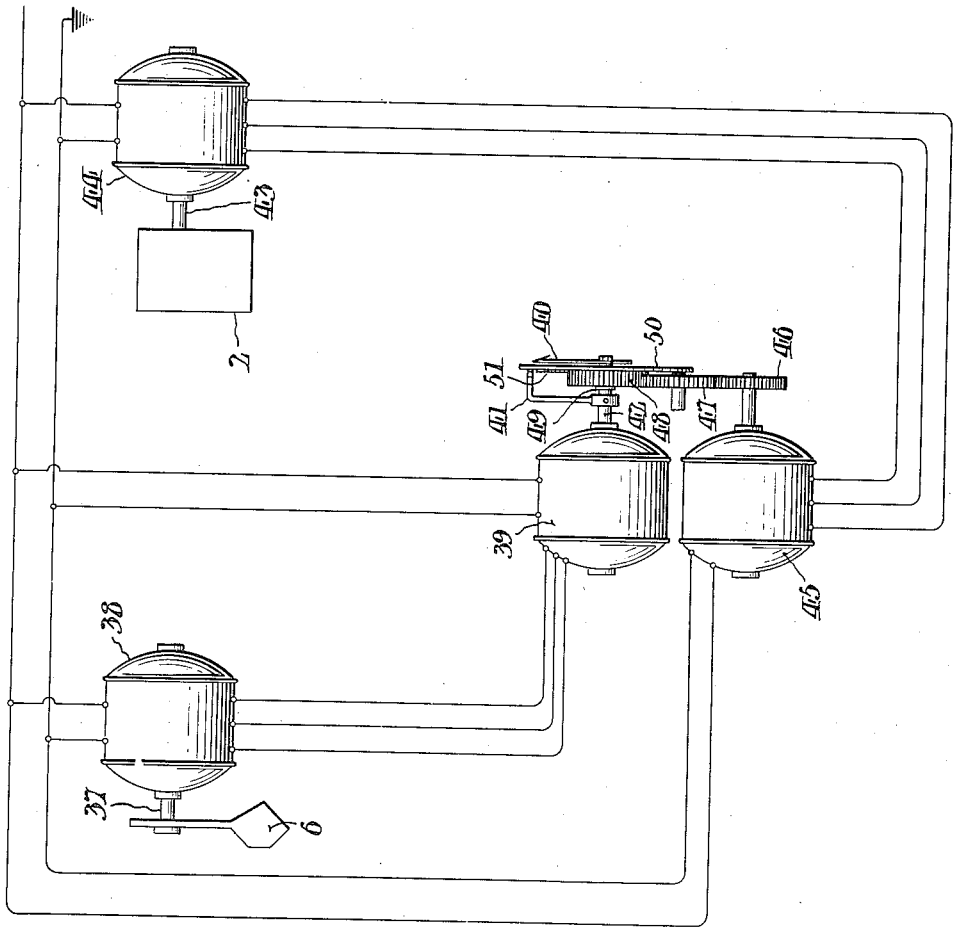
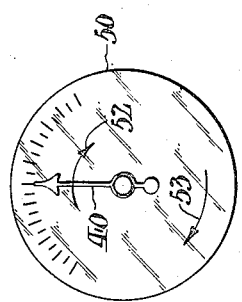
WITNESSES:
INVENTOR:
Edwin F. Saxman, Jr.,
BY Paul & Paul
ATTORNEYS.

Patented Mar. 12, 1940

2,193,077

UNITED STATES PATENT OFFICE 2,193,077

STALL WARNING SYSTEM FOR AIRCRAFT

Edwin F. Saxman, Jr., Radnor, Pa.

Application November 18, 1938, Serial No. 241,169

6 Claims. (Cl. 177—311)

This invention relates to stall warning systems for aircraft and particularly to stall indicating and stall alarm systems for aircraft having means for changing the stalling characteristics while in flight.

In the operation of aircraft there are certain times, particularly in landing and taking off, when an increase is required in the ratio of lift to air speed in excess of the ratio for normal level flight. This increase is obtainable by increasing the angle of attack of the aircraft, the lift increasing with the angle of attack up to a certain critical angle at which the lift decreases very sharply and a stalling condition results. A relatively small increase in the angle of attack is sufficient to change from a condition of maximum lift to a condition of stall which adds to the difficulty of safely operating aircraft having relatively low critical angles of attack. Therefore various control devices have been developed for changing the stalling characteristics of aircraft while in flight. In general these devices operate to increase the critical angle of attack. Movable flaps located on the wings as well as on the fuselage are commonly used for this purpose as well as for increasing the drag. So-called "wing slots" are also used.

Theoretically, the effect of increasing the critical angle of attack by the use of such devices makes possible the use of greater angles of attack with a corresponding increase in lift and maneuverability without stalling. However, the theoretical benefits have been only partly obtainable in practice because the pilot has heretofore been without means for accurately determining how close he is to a stalling condition after the stalling characteristics of the aircraft have been changed by the operation of the flaps, slots, or the like. Consequently a large part of the potentially usable increased lift and drag cannot be safely utilized and inefficiencies of operation thereby result. Moreover, when flying on instruments and with control flaps or the like operating to change the normal stalling characteristics of the aircraft, the pilot operating with existing equipment has no direct indication or warning as to his approach to a stalling angle, and this constitutes one of the difficulties of "blind" landings.

One object of the present invention is to provide a stall warning system which will indicate the approach to a stalling condition of aircraft in which the stalling characteristics are changed in flight. Inasmuch as the operation of this system is independent of any visual reference to the ground, it is of particular value in making "blind" landings.

It is a further object of the present invention to provide a system for use with such aircraft for indicating position relative to the instantaneous critical angle of attack.

A further object is to provide a positive alarm system for warning the pilot of such aircraft of an approach to a stalling condition.

In the drawings, Fig. I is a side elevation view of an airplane in flight.

Fig. II is a wiring diagram of one embodiment of the present invention.

Fig. III is a plan view of angle of attack device of Fig. I with housing element shown in broken section.

Fig. IV is a diagrammatic showing of an embodiment of the present invention in which self-synchronous motors are utilized.

Fig. V is a front view of the indicating disc of Fig. IV.

Fig. VI shows the general arrangement of an alarm device together with the indicating disc.

In Fig. I airplane 1 is shown in flight. Control means for changing in flight the normal stalling characteristics of airplane 1 are shown as flaps 2 which are in a partly lowered position below the wing 3. Rod 4 is mounted on wing 3 with capacity for longitudinal adjustment as shown by the dotted lines, and carries angle of attack device 5 comprising the movable air vane 6 and housing element 7. Air vane 6 is provided with heating means (not shown) for preventing the formation of ice. Landing gear 8 carries a rod 31 which is adapted to operate switch 30 when the landing wheel 32 makes contact with the ground.

In Fig. II there is shown indicating means 9 comprising calibrated indicator 10, movable pointer 11 and resistance 12. Pointer 11 moves in response to changes in voltage drop, difference of potential being supplied by battery 13 through resistances 14, 15, and 16. Air vane 6 moves in response to changes in the angle of attack and in so doing changes the effective resistance of variable resistance 14 and hence the voltage drop. Similarly the effective resistance of variable resistance 15 is changed in response to movements of the control flap 2. Resistances 12, 14, 15, and 16 are connected in series in the circuit which includes battery 13 and consequently changes in resistances 14, 15, and 16 produce changes in voltage drop causing the pointer 11 to move. The circuit including the device 9 is energized in response to and according to changes in the resistances 14 and 15 due to the action of the devices 6 and 2, respectively, and the device 9 is thus operated by and according to the energization of the circuit due to the combined action of said devices 6 and 2. Resistance 16 is provided for adjusting the operation of the pointer 11. By proper adjustment of resistance 16 the action of pointer 11 is so controlled that it points to a predetermined calibration symbol on the scale 10 when the aircraft approaches within a few degrees of the instantaneous critical angle. For military use where inverted flight commonly occurs, scale 10 would be designed to give positive and negative readings, pointer 11 being so mounted as to swing to either side of the zero indication.

Contact element 17 is carried by pointer 11 and is adapted to make contact between points 18 and 19 when pointer 11 reaches a predetermined critical position of near approach to stalling. Solenoid 20 is thereby energized and contact element 21 is caused to connect contact points 22 and 23. When this occurs battery 24 energizes alarm 25 which comprises vibrating hammer 26 and anvil 27. Anvil 27 may be mounted so as to bring about the vibration of one or more of the pilot controls, such, for instance, as the manual elevator control usually in the form of a movably mounted wheel or movable stick.

For testing the operation of pointer 11 and alarm 25, push button switch 28 is provided. When push button element 29 of switch 28 is depressed resistance 15 is cut out, leaving only resistances 12, 16 and a predetermined portion of resistance 14 in circuit. The value of this portion of resistance 14 is determined by the position of the point 14a. This point is so chosen that the variable resistance 16 may be used in conjunction with what becomes the effective portion of resistance 14 to bring pointer 11 to the desired critical position on calibrated scale 10. Alarm means 25 is thereby caused to operate. Any defects in the circuits involved will therefore be disclosed by a failure of proper operation when push button 29 is depressed.

A switch 30 is provided for causing alarm means 25 to cease operation when the airplane has landed. Switch 30 is operated by the movement of rod 31 in response to the impact of landing wheel 32 with the ground. A spring or the like (not shown) may be used to reset switch 30 when airplane 1 leaves the ground. Switch 34 is provided for rendering pointer 11 inoperative, the effect of which is to prevent the operation of alarm means 25.

In Fig. III air vane 6 is shown in plan view and is attached to the rod 33 which is mounted on shaft 33a. Attached to shaft 33a and shown in partial section is the contact element 35 which makes rotational contact with resistance 14. The effective resistance of 14 is thereby continuously variable in response to the vertical movements of air vane 6. The variable resistance mechanism including resistance 14 and contact member 35 is housed within casing 7 which is mounted upon the rod 4 by means of the mounting brackets 36.

In Fig. IV air vane 6 is mounted on the shaft 37 of transmitting motor 38 which transmits to receiving motor 39 in response to movements of air vane 6. Pointer 40 and contact member 41 are attached to the shaft 42 of receiving motor 39. Motors 38 and 39 are self-synchronous and therefore the movements of air vane 6 are reflected in the movements of pointer 40 and contact element 41. Control flap 2 is mounted on the shaft 43 of transmitting motor 44 which is connected to receiving motor 45. By means of gears 46 and 47, motor 45 drives the gear 48 which is movably mounted on shaft 42 by means of sleeve 49. Affixed to gear 48 and rotating with it is the disc 50 which also carries the contact element 51.

In Fig. V the front of disc 50 is shown together with the independently movable pointer 40. Arrow 52 indicates the direction of rotation of pointer 40 in response to the upward movement of the air vane 6 of Fig. IV. Arrow 53 indicates the direction of rotation of the disc 50 in response to the downward motion of control flap 2 of Fig. IV.

In Fig. VI the reverse side of disc 50 is shown. Gear 48 is movably mounted upon shaft 42 by means of the sleeve 49 and disc 50 is therefore rotated independently of shaft 42 being driven through the gears 46, 47, and 48. Affixed to disc 50 and rotating with it is contact element 51. Contact element 41 is affixed to shaft 42 and rotates with it. Contact elements 41 and 51 are designed to make contact in response to the independent rotation of shaft 42 and disc 50. When this contact is made the operation of the alarm circuit shown in Fig. VI is brought about, and this happens (as in Fig. II) when the angle of attack is critically close to stalling.

When contact is made between contact elements 41 and 51 of Fig. VI the solenoid 20 of Fig. VI is energized by battery 13 and contact element 21 brings about the energization of alarm means 25 as in Fig. II.

The operation of the warning systems shown in Figs. I—III is as follows:

The forward motion of airplane 1 as it takes off creates a stream of air relative to air vane 6, the effect of which is to raise air vane 6 relative to the housing element 7, thereby decreasing resistance 14. Meanwhile, control flap 2 has been partly lowered in order to change the normal stalling characteristics of airplane 1 and resistance 15 is thereby increased. The combined operation of air vane 6 and control flap 2 controls the actuation of indicating pointer 11 which is thereby caused to point to an indicating symbol on disc 10. Pointer 11 responds to the angle of attack and to changes in this angle; but it is important to note that the pointer does not indicate the angle of attack. It indicates rather the position of the airplane relative to whatever may be the instantaneous critical angle of attack produced or determined by the action of control flap 2 and therefore warns of the approach to a stalling condition. In other words, the relative movement of the pointer 11 along the scale of disc 10 indicates the progress of approach of the aircraft to the stalling condition determined by the control 2. The pilot therefore operates the airplane in such a way as to keep pointer 11 at a predetermined optimum position relative to the scale of indicating disc 10 but sufficiently far removed from the higher values at the upper end of disc 10 so as to insure prevention of reaching a stalling condition. In this way he is able to operate the airplane at the most efficient attitude to the relative wind which would not be the case if he relied solely on the "feel" of the airplane.

Due, however, to the complexity and great number of visual indicators on the control panel it is quite possible that the warning indication of pointer 11 may be overlooked. In this event, the energization of solenoid 20 by virtue of the contact of element 17 with contact points 18 and 19 effects the application of energy to vibratory alarm device 25 through contact element 21. The hammer 26 of alarm device 25 may be mounted on one of the spokes of the main control wheel which the pilot operates manually. Anvil 27 may be mounted on the rim of this manual control wheel in a position to receive the impacts of vibrating hammer 26. The control wheel normally is used to control both the lateral inclination of the wings to the horizontal, which is accomplished through the ailerons, and also to change the angle of attack of the wings which is accomplished through the elevators, a decrease in the angle of attack usually being brought about by pushing forward on the control wheel which is mounted on a movable column or arm. The same procedure applies where the manual elevator control is a stick rather than a mounted wheel. On receiving the vibration warning the pilot immediately pushes forward on the control, partly in response to the natural impulse occasioned by the vibration of the wheel or stick in the palm of his hand. The resultant decrease in angle of attack takes the airplane out of the position of near approach to stall. The effect on air vane 6 of pushing forward on the elevator control is to cause it to take a lower position and the resulting increase in resistance 14 causes pointer 11 to swing to the left. The contact of element 17 with points 18 and 19 is therefore broken and as a result solenoid 20 is de-energized causing contact element 21 to resume its former position out of contact with points 22 and 23. Alarm 25 is thereby de-energized and the vibration of the manual control in the hands of the pilot ceases. Visual alarm means such as a light or aural alarm means such as a horn may be used in conjunction with or as substitutes for preferred alarm means 25.

In making an approach for landing the indication of pointer 11 is again used to make possible the safe use of a relatively high angle of attack without danger of a stall. This is accomplished by operating the airplane so that pointer 11 is at a predetermined position with respect to indicator 10. This position will vary for different types of airplanes. As the landing is completed it is often desirable to negotiate the last few feet in a stalling condition, in which case the alarm 25 is operated momentarily. This operation ceases, however, as soon as the landing wheel 32 touches the ground and operates switch 30 by means of movable rod 31. Means for re-engaging switch 30 when landing wheel 32 leaves the ground in taking off may be provided in the form of a spring or counterbalancing weight (not shown).

In the operation of the warning system of Fig. IV movements of air vane 6 in response to changes in the angle of attack and movements of control flap 2 are transmitted to indicating means by operation of the self-synchronous motors 38, 39, 44, and 45, which combine the operations of air vane 6 and control flap 2 in the indicating means comprising independently rotating disc 50 and pointer 40, operated, respectively, by said flap 2 and by said air vane 6, and coacting (like the disc 10 and pointer 11 in Fig. II) to indicate the progress of approach of the aircraft to the stalling condition determined by the flap 2. This indicator is used in flight in the same way as the indicator 9 in Fig. II and alarm 25 of Fig. VI is used in the same way as the alarm of Fig. II.

It will be understood that the particular indicating and alarm devices described herein are merely preferred embodiments of devices suitable for carrying into effect the stall warning system of the invention.

Having thus described my invention, I claim:

1. In a stall warning system for aircraft, angle of attack means responsive to the angle of attack of said aircraft, control means for changing in flight the stalling characteristics of said aircraft, indicating means for warning of the approach of said aircraft to a stalling condition, and means responsive to the operation of said angle of attack means and of said control means for actuating said indicating means as the aircraft approaches the stalling condition determined by said control means.

2. A stall warning system for aircraft as set forth in claim 1 wherein the control means for changing in flight the stalling characteristics of the aircraft comprises movable flaps, while the indicating means comprises an alarm actuated when the angle of attack is critically close to the stalling condition determined by the movement of the flaps.

3. A stall warning system for aircraft comprising angle of attack means responsive to the angle of attack of the aircraft, control means for changing in flight the stalling characteristics of the aircraft, means for indicating the progress of approach of said aircraft to a stalling condition, and means for actuating said indicating means in response and according to the operation of said angle of attack means and of said control means, as the aircraft progressively approaches the stalling condition determined by said control means.

4. A stall warning system for aircraft comprising angle of attack means responsive to the angle of attack of the aircraft, control means for changing in flight the stalling characteristics of the aircraft, an electric circuit energized in response and according to the combined action of said angle of attack means and said control means, and indicating means, for indicating the progress of approach of said aircraft to a stalling condition, operated by and according to the energization of said circuit as the aircraft progressively approaches the stalling condition determined by said control means.

5. A stall warning system for aircraft comprising angle of attack means responsive to the angle of attack of said aircraft, control means for changing in flight the stalling characteristics of said aircraft, indicating means including a movable indicator for indicating the approach of said aircraft to a stalling condition, an electric circuit with means for energizing it to actuate said movable indicator, and variable resistances in said electric circuit controlled and varied by changes in the position of said angle of attack means and of said control means, whereby said movable indicator is progressively actuated in response to the combined action of said angle of attack means and said control means as the aircraft approaches the stalling condition determined by said control means.

6. A stall warning system for aircraft comprising angle of attack means responsive to the angle of attack of said aircraft, control means for changing in flight the stalling characteristics of said aircraft, and indicating means for warning of the approach of said aircraft to a stalling condition, including movable indicating elements actuated, respectively, by said angle of attack means and by said control means, and coacting to indicate the progress of approach of said aircraft to the stalling condition determined by said control means.

EDWIN F. SAXMAN, Jr.